(Model.)
T. DONLON.
JAW TRAP.
No. 392,415. Patented Nov. 6, 1888.
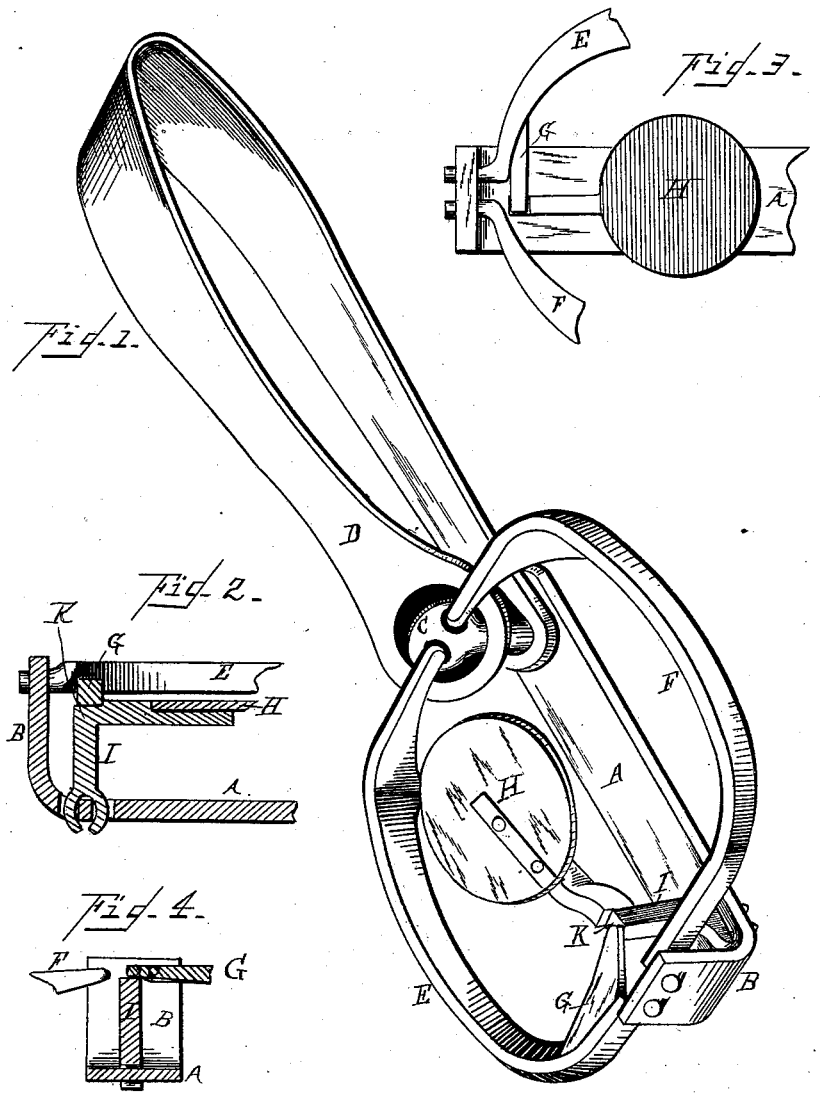
WITNESSES.
L. W. Bartlett.
P. Jullien.
INVENTOR.
Thomas Donlon.
By W. A. Bartlett.
Atty.

UNITED STATES PATENT OFFICE.

THOMAS DONLON, OF CORTLAND, NEW YORK.

JAW-TRAP.

SPECIFICATION forming part of Letters Patent No. 392,415, dated November 6, 1888.

Application filed September 19, 1888. Serial No. 285,827. (Model.)

*To all whom it may concern:*

Be it known that I, THOMAS DONLON, residing at Cortland, in the county of Cortland and State of New York, having invented certain new and useful Improvements in Jaw-Traps, of which the following is a specification, reference being had therein to the accompanying drawings.

The invention relates to animal-traps of the kind usually known as "jaw-traps" or "steel traps."

The invention consists in the construction and combination of parts, as hereinafter described, whereby the cross-bar generally employed is dispensed with and the bait-pan made to engage directly with a stop on one of the jaws to hold the trap open.

Figure 1 is a perspective view of the trap set. Fig. 2 is a broken section of one end of the trap (set) on line $x\,x$, Fig. 3. Fig. 3 is a broken plan of one end of the trap set. Fig. 4 is a broken cross-section on line $y\,y$.

A indicates the base-bar of the trap, turned up at one end to form the pivotal standard B for the jaws, and having another jaw-standard, C, around which the loops of the bent spring D pass under the jaws, as usual in jaw-traps. The jaws E and F are pivoted in the standards, as usual. The jaw E has a piece, G, attached, which extends beyond its pivot in a direction opposite to the jaw proper.

The bait-pan H has a post, I, at an angle to the pan proper, which post is pivoted in the bar A a little to one side of the center and on the side opposite that of the pivot of the jaw E. There is a shoulder, K, on this post, which, when the jaws are opened and pan H lifted up, comes under the piece G, where it extends beyond the pivot of jaw E. This engagement of the piece G with the post I holds the jaws from closing, as the jaw E cannot rise at one side of its pivot until the end of piece G is permitted to swing down at the other side of said pivot.

The trap being set, as in Fig. 1, a weight on pan H, sufficient to swing the post I away from under piece G, releases the jaws and permits the spring D to act on said jaws to close them in the usual manner.

The advantage of this form of trap is that it is of simple construction and entirely dispenses with the usual cross-bar, thus permitting the trap to be placed in a position (as in a small hole) where a cross-bar trap could not be applied. It is also considered more certain in its operation than a trap which has a cross-bar and bait-pan attached thereto.

The main feature of my invention is that a piece or projection on the jaw shall engage directly with the bait-pan support, so that the common cross-bar may be dispensed with and the smallest practicable number of parts be employed. The piece G, bearing on the post I in the direction of its length, applies but slight strain on the pivot and bearing.

What I claim is—

1. A jaw-trap provided with a base-piece and spring, as usual, a bait-pan having its post pivoted in the base-piece, and jaws, one of which has a projection extending therefrom and bearing directly on the bait-pan support, all in combination, substantially as described.

2. A jaw-trap having a longitudinal base-piece, standards, jaws, and spring, a projection on one of the jaws extending beyond its pivot, and a bait-pan having its post pivoted in the base-piece at the side opposite said jaw, so that the projection on the jaw may bear perpendicularly on a shoulder on the bait-pan support when the trap is set and swing downward when the trap is sprung, all in combination, substantially as described.

In testimony whereof I affix my signature in presence of two witnesses.

THOMAS DONLON.

Witnesses:
 JOHN W. SUGGETT,
 THOS. E. COURTNEY.